July 6, 1937.      R. RIEGLER      2,085,924
NITRATOR
Original Filed May 25, 1929      2 Sheets-Sheet 1

Inventor
RIEWEN RIEGLER
by Forbes Silsby
Attorney

July 6, 1937.   R. RIEGLER   2,085,924
NITRATOR
Original Filed May 25, 1929   2 Sheets-Sheet 2
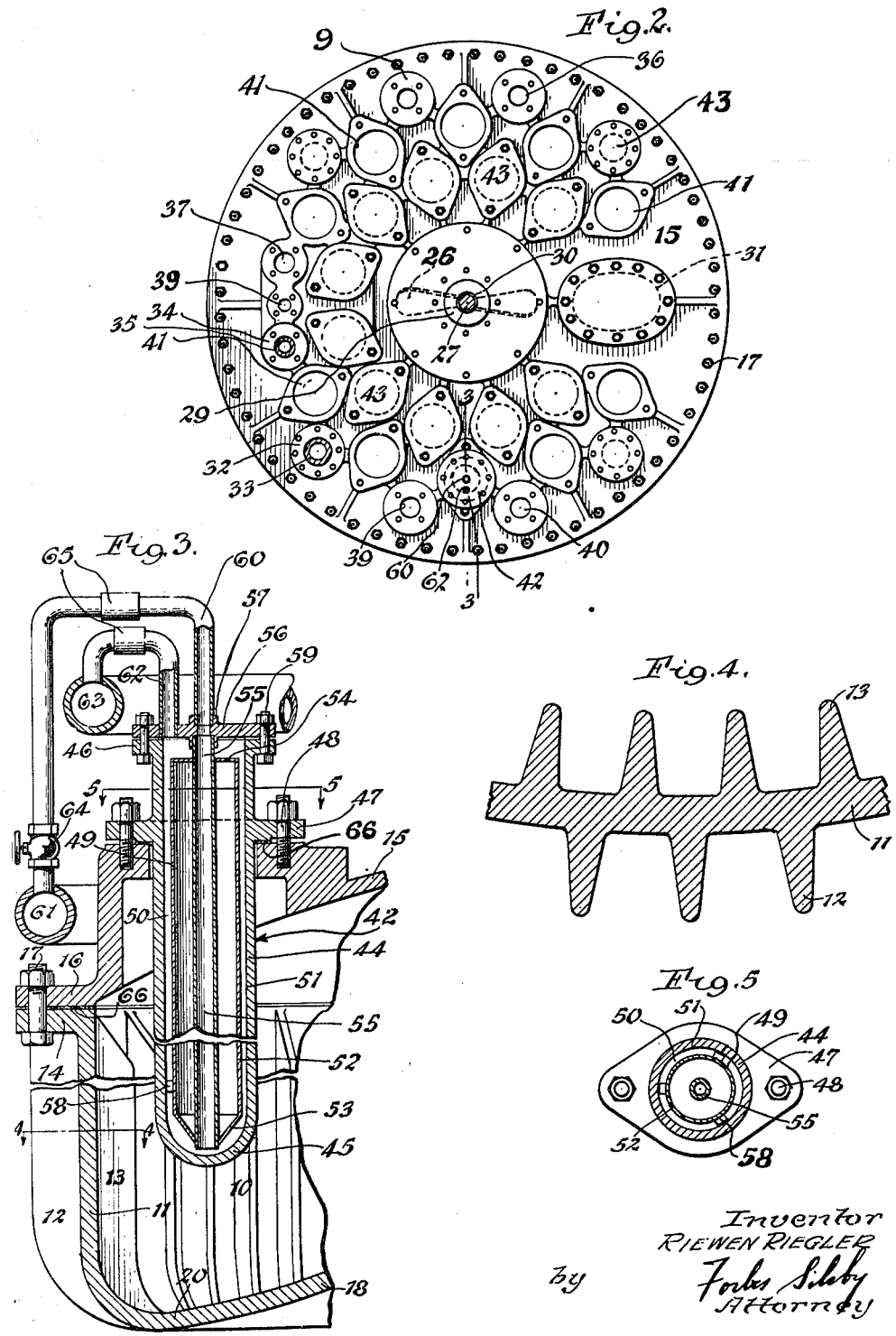
Inventor
RIEWEN RIEGLER
by Forbes Silsby
Attorney Patented July 6, 1937

2,085,924

UNITED STATES PATENT OFFICE 2,085,924

NITRATOR

Riewen Riegler, Buffalo, N. Y., assignor to National Aniline & Chemical Company, Inc., New York, N. Y., a corporation of New York Application May 25, 1929, Serial No. 365,996
Renewed December 19, 1934

14 Claims. (Cl. 257—106)

This invention relates to an apparatus useful in carrying out chemical reactions, particularly, nitration operations. It relates especially to an apparatus adapted to the nitration of organic substances; such as, benzol, toluol, chlorbenzol, naphthalene, and the like.

One general process commonly employed for the nitration of an organic substance, such as, benzol, involves reaction of said substance with so-called "mixed acid" (a mixture of nitric and sulfuric acids). For efficient operation of said process it is essential that the reaction mixture be well cooled.

It is the principal object of the present invention to provide an apparatus adapted to efficiently cool a nitration reaction mixture. Another object of the invention is to provide a reaction vessel whose walls are adapted to present an extensive cooling surface to the reaction mixture. Another object of the invention is to provide efficient cooling means for the interior portions of the body of reaction mixture. Another object of the invention is to provide a form of apparatus which is capable of withstanding relatively high internal pressure and which can be readily cast.

These and other objects of the invention, which will be apparent from a consideration of the following disclosure, are accomplished, according to the present invention, by the provision of an apparatus which comprises a nitrating vessel immersed in a cooling bath and having heat conducting means on the inner and outer surfaces of its walls, and complementary cooling means within said vessel comprising removable closed cartridges or tubes through which a cooling liquid can be circulated, the cooling tubes being so constructed that a maximum cooling effect is obtained.

In a preferred embodiment of the invention, the nitrating vessel comprises a vertical cylindrical tank closed at the bottom. The walls of the vessel are formed with longitudinal fins or projections which extend radially substantially from the top to the bottom of the vessel, both inside and outside; the inner fins being staggered with relation to the outer fins. A jacket surrounding the wall of the vessel in spaced relation and adapted to contain cooling liquid provides a means for removing heat through the walls of the vessel. The vessel is closed by means of a cover containing openings for the agitator shaft, for thermometer wells, for sampling ports, for cooling cartridges, for connections to feed lines for the acid and the material to be nitrated, and for connections to air pressure lines and to blow lines for educting the finished reaction mixture. Individual removable cover plates are provided for closing openings in the cover not being used.

The internal cooling means, in a preferred embodiment, comprises a number of closed cartridges or elongated tubes adapted to project through openings in the cover of the nitrating vessel to within a short distance of the bottom of said vessel. An inner pipe leading to within a short distance of the lower closed end of a cartridge provides a means for introducing cooling liquid into said cartridge, and, in a specific embodiment, a closed cylinder surrounding said pipe and forming a narrow passage with the inner wall of said cartridge causes the cooling liquid in flowing through said passage to take the form of a relatively thin sheet, thereby increasing the cooling effect. A suitable opening leading from said passage provides an outlet for the cooling liquid. Each cooling cartridge has its individual detachable valved connection to a source of cooling fluid, and each is removably connected to the cover; so that any desired number of cooling fingers may be employed, depending upon the extent of cooling desired.

For a better understanding of the invention, reference should be had to the following description and the accompanying drawings forming a part of this specification, wherein is described and illustrated a preferred apparatus embodying the principles of said invention; but it is to be understood that the invention is not limited thereto, except as indicated in the claims.

Fig. 1 of the drawings is an elevation, partly in section, showing the nitrator;

Fig. 2 is a top plan view of the nitrator cover showing one of the cooling cartridges in place;

Fig. 3 is a fragmentary sectional elevation of the vessel taken along the line 3—3 of Fig. 2;

Fig. 4 is a fragmentary horizontal section of the vessel wall, taken along the line 4—4 of Fig. 3, showing the inner and outer radial fins; and Fig. 5 is a sectional view of a cooling cartridge taken along the line 5—5 of Fig. 3.

Figure 1:
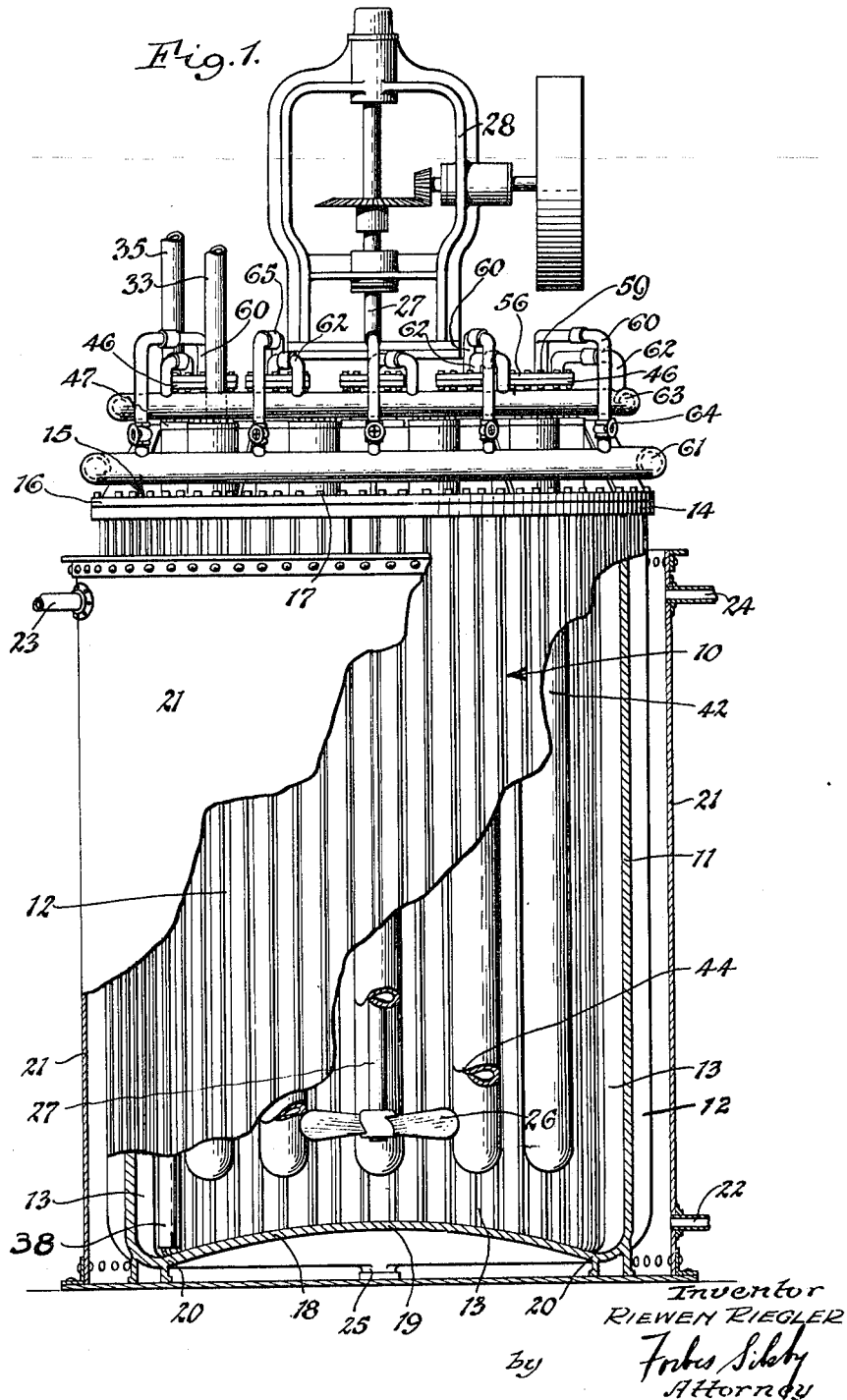

Referring more particularly to said drawings, 10 represents a nitrating vessel preferably made of cast iron and having a vertical cylindrical wall 11, longitudinal exterior fins 12, and longitudinal interior fins 13 in staggered relation to said exterior fins 12. The upper edge of the vessel 10 is formed with a lip or flange 14 adapted to support a cover 15 having a flange 16 registering with flange 14. Bolts 17 serve to secure the cover to the vessel. The bottom portion 18 of the vessel 10 is convoluted in cross-section, the central inner portion 19 being convex in cross-section, and the inner portions 20 adjacent the wall being concave in cross-section, thereby forming an annular depression. A jacket 21 adapted to contain a cooling liquid and having inlet and outlet openings 22, 23 and 24 surrounds the vessel 10. Feet 25 serve both to support the vessel and to elevate it from the bottom of the jacket 21. An agitator 26 is mounted on a shaft 27, which is driven by and suspended from a suitable driving mechanism 28 mounted on cover 15 and is journaled in bearing 29 mounted in said cover.

The cover 15, as more clearly shown in Fig. 2, is provided with a number of openings, and is formed to provide flanges 9 adapted to register with corresponding flanges of the pipes, etc. connected thereto. Opening 30 provides a passage for the agitator shaft 27 and its bearing 29; 31 is a manhole; 32 is a flange forming a connection for a vent-pipe 33 open to the atmosphere; 34 is a flange forming a connection for the feed line 35 for the material to be nitrated and for the nitrating acids; 36 is a sampling port; 37 provides a passage for the discharge line 38; and 39 and 40 are openings for indicating and recording thermometers, for a compressed air line, for a safety valve, and the like. 41 and similar openings are provided for the insertion of cooling cartridges or tubes 42. Individual covers 43 adapted to be bolted to the cover 15 are provided for closing openings not in use.

A cooling cartridge 42 comprises a tubular casing 44, preferably made of cast iron, closed at the inner end 45, having a lip or flange 46 at the outer open end, and having near said outer end a collar or flange 47 adapted to support the cartridge from cover 15, to which it is removably secured by means of stud bolts 48. A hollow closed cylindrical spreader 49 of somewhat smaller diameter than the internal diameter of the tubular casing 44 extends within the interior of said tubular casing to within a short distance of the inner end 45 thereof, forming a narrow annular passage 50 for the cooling liquid, whereby said liquid is brought into intimate contact with the interior wall 51 of the casing 44. The spreader 49 comprises a cylindrical tube 52, of somewhat smaller diameter than the internal diameter of casing 44, secured at its inner end to a conical ring 53, and at its outer end to a circular disc 54, e. g., by welding. A pipe 55 of relatively small diameter, projecting through said ring 53 and disc 54 and secured thereto, as by welding, serves as a passage for cooling liquid through said spreader 49, and, being secured to a plate 56 by coupling 57 welded to said plate, serves to support spreader 49 within the casing 44. Spacers 58 welded to spreader 49 serve to hold it approximately concentrically in spaced relation within tubular casing 44. Bolts 59 secure the plate 56 to the flange 46. A pipe 60 connected to the outer side of coupling 57 serves to connect pipe 55 with a manifold 61 adapted to contain cooling liquid, and pipe 62 leading from passage 50 and connected with an outlet manifold 63 serves as an outlet for said cooling liquid. Each inlet pipe 60 is provided with a regulating valve 64 whereby the cooling effect of each cartridge may be individually controlled, and in addition the couplings 65 between pipes 60 and 62 and manifolds 61 and 63, respectively, are preferably readily separable, so that unnecessary cartridges may be readily removed. Suitable plugs (not shown) prevent unused outlet couplings 65 from overflowing when disconnected. Suitable packing 66 renders the assembled vessel pressure tight.

In carrying out the nitration of a liquid organic material, the material, for example, benzol, together with a part of the mixed nitrating acid is introduced into the vessel 10 by means of feed pipe 35. Agitator 26 is set into operation and cooling liquid is circulated through cooling jacket 21 and cooling cartridges 42. Additional mixed nitrating acid is then introduced through feed-pipe 35 and the reaction is permitted to take place until completed. At the completion of the reaction, air or other suitable gas under pressure is admitted to the vessel through opening 40, and the reaction mixture is blown out of the vessel through discharge pipe 38, which, as shown in Fig. 1, reaches to within a short distance of the bottom of the vessel within the concave portion 20 so that a minimum amount of material is left in the vessel.

The number of cooling cartridges placed in operation will vary depending upon the temperature at which the reaction mixture is desired to be maintained, which, as is well known, will in turn depend, among other things, upon the particular reacting ingredients employed and their proportions. As cooling liquid there may be employed water, brine, or any other suitable substance. Variation in the temperature can be readily secured by regulating the amount of cooling liquid supplied to the individual cooling fingers and/or to the cooling jacket. If the maximum degree of cooling required for a particular nitration does not necessitate the employment of the total number of cooling cartridges available, the superfluous cartridges may be removed, leaving only those necessary to supply the required amount of cooling and thereby increasing the available capacity of the nitrating vessel. When a cooling cartridge is removed, the opening 41 in cover 15 left by such cartridge is closed by a suitable cover 43.

It will be understood that the invention is not limited to the above specific embodiment, but that changes may be made therein within the scope of the claims. The use of the apparatus is not restricted to nitration processes, and it can be employed for other reactions wherein efficient transfer of heat to or from the reaction mixture is required, e. g., sulfonations, chlorinations, and various catalytic reactions. Furthermore, when desired, the jacket and cartridges may contain a heating fluid, such as steam, instead of a cooling fluid; and if desired the jacket may be closed instead of being open, as shown. If desirable during a particular reaction, the apparatus also may be used to cool the reaction mixture during one period of reaction and heat it during another.

The apparatus has been described as being made of cast-iron, and that material is preferred for apparatus employed in nitrations, in view of its resistance to the action of the nitrating acids and its ready adaptability to casting; but other suitable materials may be employed under other conditions, e. g., aluminum, duriron, various bronzes and other alloys, etc. Instead of the fins extending longitudinally of the vessel, they may extend laterally, but the longitudinal arrangement is preferred because of ease in casting. If desired, the heat conducting surface of the cartridges can be increased by providing them also with fins, and instead of their inlets and outlets for the cooling liquid being as shown, these may be reversed so that the direction of ow of the cooling liquid through a cartridge will be opposite to that shown.

The invention thus provides an apparatus adapted to present a maximum of cooling surface to a reaction mass. The longitudinal fins, in view of their projection into the reaction mass and into the cooling bath, and by reason of their high heat conductivity, aid in removing heat not only from the portion of the reaction mixture ordinarily in contact with the vessel wall, but also from those portions ordinarily somewhat removed therefrom, as well as in increasing the effective cooling surface of the vessel; thereby providing a highly efficient transference of heat between the reaction mass and the exterior cooling means. In addition, the fins mitigate the tendency of the reaction mass to swirl, thereby assisting the agitation and rapidity of heat transfer. By means of the cooling cartridges the desired degree of cooling of the interior portions of the reaction mass can be controlled while utilizing the maximum cooling effect of each individual cartridge; and by reason of the individual control, the effect of each can be localized or flexibly varied.

I claim:

1. A nitration apparatus comprising in combination a reaction vessel having its walls formed with inner and outer fins, a jacket for said vessel adapted to contain a liquid, a cover for said vessel, means carried by said cover for introducing material to be nitrated and the nitrating agent into the vessel and for removing reaction mixture from the vessel, an agitator, and means carried by said cover for cooling the interior of said vessel.

2. A nitration apparatus comprising in combination a cylindrical reaction vessel having its walls formed with inner and outer longitudinal fins, a jacket for said vessel adapted to contain a liquid, a cover for said vessel, means carried by said cover for introducing material to be nitrated and the nitrating agent into the vessel and for removing reaction mixture from the vessel, an agitator, and removable means detachably secured to said cover for cooling the interior of said vessel.

3. A nitration apparatus comprising in combination a cylindrical reaction vessel having its walls formed with inner and outer longitudinal fins in staggered relation to each other, a jacket for said vessel adapted to contain a liquid, a cover for said vessel, means carried by said cover for introducing material to be nitrated and the nitrating agent into the vessel and for removing reaction mixture from the vessel, an agitator, and a cartridge carried by said cover and projecting into said vessel, said cartridge comprising a hollow cylindrical tube closed at its inner end and containing means for circulating a liquid through said tube in the form of a relatively thin sheet in contact with the inner wall of said tube.

4. A nitration apparatus comprising in combination a cylindrical reaction vessel having its walls formed with inner and outer longitudinal fins in staggered relation to each other, a jacket for said vessel adapted to circulate a liquid in contact with said outer fins, a cover for said vessel, means carried by said cover for introducing material to be nitrated and the nitrating agent into the vessel and for removing reaction mixture from the vessel, an agitator, a plurality of cartridges removably secured to said cover and projecting into said vessel, means for circulating a liquid through said cartridges in the form of a relatively thin sheet in contact with the inner walls thereof, a manifold adapted to supply said liquid to said cartridges, individual means for controlling the supply of liquid to each cartridge, and separable connections between said manifold and said cartridges.

5. A nitration apparatus comprising in combination a reaction vessel having its walls formed with inner and outer longitudinal fins in staggered relation to each other and having its bottom formed with a depression near the inner wall, and a plurality of means within said vessel for cooling the interior thereof, said means being selectively removable to vary the cooling capacity of said apparatus.

6. A nitration apparatus comprising in combination a reaction vessel having its walls formed with inner and outer longitudinal fins in staggered relation to each other and having its bottom formed with a depression near the wall and a raised central portion, a plurality of cooling cartridges projecting into said vessel having their inner ends closed and containing means for circulating a liquid therethrough, said cartridges being selectively removable to vary the cooling capacity of said apparatus.

7. In a nitration apparatus, a substantially vertical reaction vessel having a closed bottom and open at the top, substantially vertical fins on the inner wall of said vessel, the bottom of said vessel having a depression formed therein near the wall thereof, a cover for said vessel, means carried by said cover for cooling the interior of the vessel, an agitator carried by said cover, means for introducing material to be nitrated and the nitrating agent into the vessel, and means carried by said cover for withdrawing reaction mixture from said vessel, said latter means including a tube opening into the reaction vessel within the depression in the bottom thereof.

8. In a nitration apparatus, a substantially vertical reaction vessel having a closed bottom and open at the top, a temperature regulating jacket enclosing the vessel, substantially vertical fins formed on the inner and outer walls of the vessel in staggered relation to facilitate transfer of heat from the interior of the vessel to the jacket, a depression formed in the bottom of said vessel near the wall thereof, a cover for said vessel, means carried by said cover for cooling the interior of the vessel, an agitator carried by said cover, means for introducing material to be nitrated and the nitrating agent into the vessel, and means carried by said cover for withdrawing the reaction mixture from said vessel, said means including a tube opening into the reaction vessel within the depression in the bottom thereof.

9. A nitration apparatus comprising a substantially vertical cylindrical reaction vessel having a closed bottom and adapted to contain a liquid reaction mixture rotary means for agitating the reaction mixture, and longitudinal fins formed on the inner wall of said vessel to facilitate transfer of heat from the reaction mixture to the exterior of said vessel and to reduce the tendency of the reaction mixture to rotate upon agitation.

10. A nitration apparatus comprising a substantially vertical cylindrical reaction vessel having a closed bottom and adapted to contain a liquid reaction mixture and rotary means for agitating the reaction mixture, longitudinal fins formed on the inner wall of said vessel to facilitate transfer of heat from the reaction mixture to the exterior of said vessel and to reduce the tendency of the reaction mixture to rotate upon agitation, longitudinal fins formed on the outer wall of said vessel in staggered relation to said inner fins, and an annular depression formed in the bottom of said vessel adjacent said inner wall to facilitate removal of liquid from said vessel.

11. A nitration apparatus comprising a substantially vertical cylindrical reaction vessel having a closed bottom and adapted to contain a reaction mixture, rotary means in said vessel for agitating the reaction mixture, longitudinal fins formed on the inner wall of said vessel to facilitate transfer of heat from the reaction mixture to the exterior of said vessel and to reduce the tendency of the reaction mixture to rotate upon agitation, and means within said vessel for regulating the temperature of the reaction mixture.

12. A nitration apparatus comprising a substantially vertical cylindrical reaction vessel having a closed bottom and adapted to contain a liquid reaction mixture, a rotary agitator in said vessel for agitating the reaction mixture, longitudinal fins formed on the inner wall of said vessel to facilitate transfer of heat from the reaction mixture to the exterior of said vessel and to reduce the tendency of the reaction mixture to rotate upon agitation, longitudinal fins formed on the outer wall of said vessel in staggered relation to said inner fins, an annular depression formed in the bottom of said vessel near said inner wall to facilitate removal of liquid from said vessel, and a plurality of means within said vessel for regulating the temperature of the reaction mixture, said means being selectively removable to vary the temperature regulating capacity of said apparatus.

13. A nitration apparatus comprising a substantially vertical cylindrical reaction vessel having a closed bottom and adapted to contain a liquid reaction mixture and rotary means for agitating the reaction mixture, longitudinal fins formed on the inner wall of said vessel to facilitate transfer of heat from the reaction mixture to the exterior of said vessel and to reduce the tendency of the reaction mixture to rotate upon agitation, and a depression formed in the bottom of said vessel near said wall to facilitate removal of liquid from said vessel.

14. In a nitration apparatus, a cartridge adapted to be unitarily removed from said apparatus comprising in combination a casing having a closed semi-spherical inner end and an open outer end, a pipe extending into said casing and spaced from the semi-spherical inner end thereof, a cylindrical member secured near the upper end of said pipe and forming a narrow annular passage with the interior surface of said casing, and a frusto-conical member attached to the bottom of said cylindrical member and forming a narrow passage with said semi-spherical inner end of said casing, said last-named passage being in communication with said annular passage.

RIEWEN RIEGLER.